(12) United States Patent
Kato et al.

(10) Patent No.: US 6,682,787 B2
(45) Date of Patent: Jan. 27, 2004

(54) LIQUID CRYSTAL COMPOSITION, LIQUID CRYSTAL DISPLAY DEVICE AND LIQUID CRYSTAL DISPLAYING METHOD

(75) Inventors: Takashi Kato, Kawasaki (JP); Norihiro Mizoshita, Tokyo (JP); Kenji Hanabusa, Ueda (JP)

(73) Assignee: JSR Corporation, Tokyo (JP)

( * ) Notice: Subject to any disclaimer, the term of this patent is extended or adjusted under 35 U.S.C. 154(b) by 68 days.

(21) Appl. No.: 10/077,885

(22) Filed: Feb. 20, 2002

(65) Prior Publication Data

US 2002/0158228 A1 Oct. 31, 2002

(30) Foreign Application Priority Data

Feb. 22, 2001  (JP) ........................................ 2001-046447

(51) Int. Cl.$^7$ ..................... C09K 19/52; C09K 19/02
(52) U.S. Cl. .................... 428/1.5; 428/1.2; 252/299.01; 252/299.5; 516/900
(58) Field of Search .............. 428/1.2, 1.5; 252/299.01, 252/299.4, 299.5; 516/900

(56) References Cited

U.S. PATENT DOCUMENTS 6,074,710 A    6/2000   Kato et al. .................... 425/1.5

FOREIGN PATENT DOCUMENTS

| JP | 11-21556    | 1/1999 |
| JP | 11-52341    | 2/1999 |
| JP | 11-60619    | 3/1999 |
| JP | 11-256164   | 9/1999 |
| JP | 2000-239663 | 9/2000 |

OTHER PUBLICATIONS

English translation of JP 11–256164 by computer, http://www6.ipdl.jpo.go.jp/Tokujitu/PAJdetail.ipdl?N0000=60&N0120=01&N2001=2&N3001=H11-256164.*
English translation of JP 2000–239663 by computer, http://www6.ipdl.jpo.go.jp/Tokujitu/PAJdetail.ipdl?N0000=60&N0120=01&N2001=2&N3001=2000-239663.*
T. Kato, et al., Advanced Materials, vol. 10, No. 8, pps. 606–608, "Gelation of Room–Temperature Liquid Crystals by the Association of a Trans–1,2–Bis (Amino) Cyclohexane Derivative", 1998.
N. Mizoshita, et al., Advanced Materials, vol. 11, No. 5, pps. 392–394, " Self–Aggregation of an Amino Acid Derivatives as a Route to Liquid–Crystalline Physical Gels–Faster Response to Electric Fields", 1999.
N. Mizoshita, et al., Chem. Commun., pps. 781–782, "Smectic Liquid–Crystalline Physical Gels. Anisotropic Self–Aggregation of Hydrogen–Bonded Molecules in Layered Structures", 1999.
K. Yabuuchi, et al., Chem. Mater, vol. 12, No. 2, 440–443, "Liquid–Crystalline Physical Gels: Self–Aggregation of a Gluconamide Derivative in Mesogenic Molecules for the Formation of Anisotropic Functional Composites", 2000.
N. Mizoshita, et al., Journal of Photopolymer Science and Technology, vol. 13, No. 2, pps. 307–312, "Physical Gelation of Nematic Liquid Crystals with Amino Acid Derivatives Leading to the Formation of Soft Solids Responsive to Electric Field", 2000.
N. Mizoshita, et al., Proceedings of SPIE, vol. 4107, pps. 108–113, "Liquid Crystalline Physical Gels: Electrooptic Properties and Microphase–Separated Structures", 2000.
N. Mizoshita, et al., Displays, vol. 22, pps. 33–37, "Nematic Liquid–Crystalline Physical Gels Exhibiting Faster Responses to Electric Fields in Twisted Nematic Cells", 2001.

* cited by examiner

Primary Examiner—Shean C. Wu
(74) Attorney, Agent, or Firm—Oblon, Spivak, McClelland, Maier & Neustadt, P.C.

(57) ABSTRACT

Disclosed is a liquid crystal composition by which the state of molecular orientation of a liquid crystalline compound can be stably maintained even when no electric field is caused to effect on, and moreover the state of molecular orientation of the liquid crystalline compound can be changed, and a liquid crystal display device and a liquid crystal displaying method by which a displayed state can be stably retained even after the action of an electric field is ceased, and moreover the displayed state can be dissolved with ease. The liquid crystal composition contains a liquid crystalline compound and a liquid crystal orientation state-regulating agent for regulating the orientated state of the liquid crystalline compound by gelling, wherein a phase transition temperature between an isotropic liquid phase and a liquid crystal phase in the liquid crystalline compound is higher than a gelling temperature by the liquid crystal orientation state-regulating agent. The liquid crystal display device has a liquid crystal layer formed of the liquid crystal composition.

20 Claims, 2 Drawing Sheets

LIQUID CRYSTAL COMPOSITION, LIQUID CRYSTAL DISPLAY DEVICE AND LIQUID CRYSTAL DISPLAYING METHOD

BACKGROUND OF THE INVENTION

1. Field of the Invention

The present invention relates to a liquid crystal composition, a liquid crystal display device and a liquid crystal displaying method making use of this liquid crystal display device.

2. Description of the Background Art

A liquid crystal display device serves to display the intended image by applying an electric field to a liquid crystal layer containing a liquid crystalline compound to control the state of molecular orientation of the liquid crystalline compound in the liquid crystal layer, and those of various systems have heretofore been known.

However, the conventional liquid crystal display devices are such that the state of molecular orientation of the liquid crystalline compound is maintained in a state that the effect of the electric field is continued, whereby the displayed state is retained, while the state of molecular orientation of the liquid crystalline compound is not maintained when the effect of the electric field is ceased, whereby the displayed state is dissolved. There has thus been a demand for development of a liquid crystal display device by which the displayed state is retained even after the effect of the electric field is ceased.

SUMMARY OF THE INVENTION

The present invention has been made on the basis of the foregoing circumstances and has as its first object the provision of a liquid crystal composition by which the state of molecular orientation of a liquid crystalline compound can be stably maintained even when no electric field is effected, and moreover the state of molecular orientation of the liquid crystalline compound can be changed.

The second object of the present invention is to provide a liquid crystal display device by which a displayed state can be stably retained even after the effect of an electric field is ceased, and moreover the displayed state can be dissolved with ease.

The third object of the present invention is to provide a liquid crystal displaying method by which a displayed state can be stably retained even after the effect of an electric field is ceased, and moreover the displayed state can be dissolved with ease.

According to the present invention, there is thus provided a liquid crystal composition comprising a liquid crystalline compound and a liquid crystal orientation state-regulating agent for regulating the orientated state of the liquid crystalline compound by gelling, wherein a phase transition temperature between an isotropic liquid phase and a liquid crystal phase in the liquid crystalline compound is higher than a gelling temperature by the liquid crystal orientation state-regulating agent.

In the liquid crystal composition according to the present invention, the liquid crystal orientation state-regulating agent may preferably be one that forms fibrous aggregates oriented in the same direction as the liquid crystalline compound in a state that the liquid crystalline compound has been oriented in a direction.

The liquid crystal orientation state-regulating agent may preferably be composed of a compound having at least one group capable of forming an intermolecular hydrogen bond and at least one alkylene group in its molecule.

The liquid crystal orientation state-regulating agent may preferably be composed of a compound having a group represented by the following general formula (1):

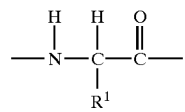

General formula (1)

wherein $R^1$ means a hydrogen atom or a monovalent organic group.

In the liquid crystalline compound according to the present invention, the liquid crystal orientation state-regulating agent may preferably be contained in a proportion of 0.05 to 30.0% by weight based on the total weight of the liquid crystal orientation state-regulating agent and the liquid crystalline compound.

According to the present invention, there is also provided a liquid crystal display device comprising a liquid crystal layer formed of the liquid crystal composition described above.

According to the present invention, there is further provided a liquid crystal displaying method comprising;

cooling a liquid crystal layer formed of the liquid crystal composition described above to a temperature not higher than a phase transition temperature between an isotropic liquid phase and a liquid crystal phase in the liquid crystalline compound in a state that the liquid crystalline compound is in the isotropic liquid phase while causing an electric field to effect on the liquid crystal layer in the thickness-wise direction thereof according to a display pattern, whereby the liquid crystalline compound is transformed from the isotropic liquid phase to the liquid crystal phase; and cooling the liquid crystal layer in the state of the liquid crystal phase, to a temperature not higher than a gelling temperature by the liquid crystal orientation state-regulating agent, whereby the liquid crystal composition is gelled.

According to the liquid crystal composition of the present invention, the liquid crystal composition is cooled to a temperature not higher than the phase transition temperature between the isotropic liquid phase and the liquid crystal phase in the liquid crystalline compound in a state heated to a temperature higher than the phase transition temperature while causing an electric field to effect on the liquid crystal composition or without causing an electric field to effect, whereby the state of molecular orientation of the liquid crystalline compound can be controlled. The liquid crystal composition is then cooled to a temperature not higher than the gelling temperature by the liquid crystal orientation state-regulating agent, whereby the fluidity of the liquid crystal composition is lost by the liquid crystal orientation state-regulating agent, and the state of molecular orientation of the liquid crystalline compound is regulated, so that the state of molecular orientation of the liquid crystalline compound can be stably retained even after the effect of the electric field is lost. The liquid crystal composition is heated again to a temperature higher than the phase transition temperature between the isotropic liquid phase and the liquid crystal phase in the liquid crystalline compound, whereby the liquid crystal composition turns into an optically isotropic liquid, so that the state of molecular orientation of the liquid crystalline compound can be changed.

According to the liquid crystal display device of the present invention, the liquid crystal layer, which has been heated to a temperature higher than the phase transition temperature between the isotropic liquid phase and the liquid crystal phase in the liquid crystalline compound, is cooled to a temperature not higher than the phase transition temperature while causing an electric field to effect on the liquid crystal layer in the thickness-wise direction thereof according to a display pattern, whereby the liquid crystalline compound is transformed from the isotropic liquid phase to the liquid crystal phase, thereby forming light-transmitting portions and light-scattering portions in the liquid crystal layer to provide the intended display pattern. The liquid crystal layer in such a state is then cooled to a temperature not higher than the gelling temperature by the liquid crystal orientation state-regulating agent, thereby gelling the liquid crystal layer so that the display pattern formed in the liquid crystal layer is being fixed.

In the state that the liquid crystal layer is at a temperature not higher than the gelling temperature by the liquid crystal orientation state-regulating agent, the state of molecular orientation of the liquid crystalline compound is regulated by molecules of the liquid crystal orientation state-regulating agent, so that the state of molecular orientation of the liquid crystalline compound remains unchanged even after the effect of the electric field is ceased. Accordingly, the light-transmitting portions and light-scattering portions in the liquid crystal layer are retained as they are, so that the displayed state is stably retained.

The liquid crystal layer is heated again to a temperature higher than the phase transition temperature between the isotropic liquid phase and the liquid crystal phase in the liquid crystalline compound, whereby the displayed state is dissolved.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE PREFERRED EMBODIMENTS

Figure 1A:
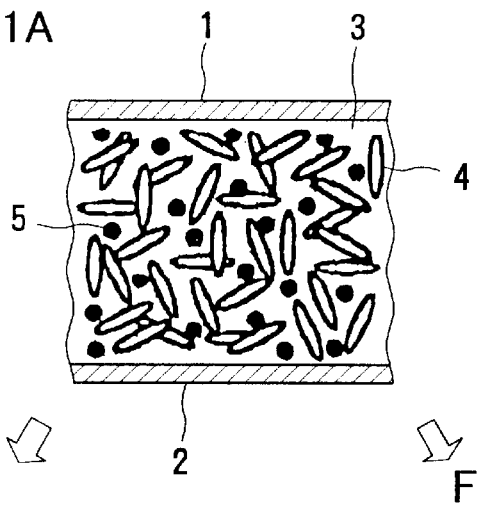
FIGS. 1A to 1E typically illustrate changes of state by temperature changes in a liquid crystal layer in which the anisotropy of dielectric constant of a liquid crystalline compound is positive.

The embodiments of the present invention will hereinafter be described in detail.

The liquid crystal composition according to the present invention comprises a liquid crystalline compound and a liquid crystal orientation state-regulating agent.

As the liquid crystalline compound in the liquid crystal composition according to the present invention, may be used various compounds heretofore used in liquid crystal display devices, for example, liquid crystalline compounds such as biphenyl compounds, phenylcyclohexane compounds, phenylpyrimidine compounds and cyclohexylcyclohexane compounds which are described in "Liquid Crystal Device Handbook" edited by No. 142 committee in the Japan Society for the Promotion of Science (1989), pp. 154–192 and pp. 715–722 and exhibit a nematic phase or smectic phase, or mixtures thereof. The liquid crystalline compound may be either positive or negative in anisotropy of dielectric constant.

As specific preferable examples of the liquid crystalline compounds, may be mentioned compounds represented by the following formulae (i) to (iii) and "E7" and "E63" (products of Merck Co.).

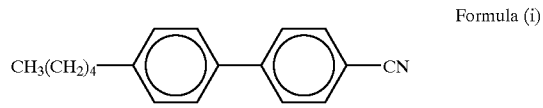

Formula (i)

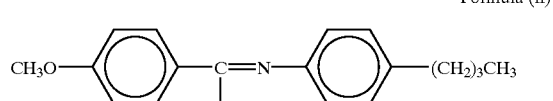

Formula (ii)

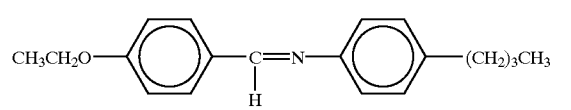

Formula (iii)

The liquid crystal orientation state-regulating agent in the liquid crystal composition according to the present invention is a substance having a nature that it is mixed into a liquid crystalline compound, whereby such a mixture is to be gelled, i.e., a substance having a function of gelling the liquid crystal composition, or a substance having a function as a gelling agent, by which the fluidity of the liquid crystal composition is substantially lost by gelling it, whereby the state of molecular orientation of the liquid crystalline compound in the liquid crystal composition is regulated.

As such a liquid crystal orientation state-regulating agent, is preferably used a compound having at least one group (hereinafter may also be referred to as "hydrogen bond-forming group") capable of forming an intermolecular hydrogen bond and at least one alkylene group in its molecule. A compound having at least two hydrogen bond-forming groups and at least two alkylene groups in its molecule is more preferred. Such a liquid crystal orientation state-regulating agent forms fibrous aggregates composed of a number of molecules fibrously aggregated by forming a hydrogen bond between molecules, whereby the oriented state of the liquid crystalline compound is regulated, and moreover the whole composition is gelled so that the fluidity of the composition is substantially lost.

Examples of the hydrogen bond-forming group include an —NHCO— group and other groups composed of a combination of —NH— and —CO—. As the alkylene group, is preferable that having at least 4 carbon atoms, particularly, that having 6 to 20 carbon atoms.

As the liquid crystal orientation state-regulating agent, is preferably used a compound having a group represented by the general formula (1). A compound having 1 to 10 of the group represented by the general formula (1) in its molecule is more preferred, with a compound having 1 to 4 of the group represented by the general formula (1) in its molecule being particularly preferred.

Specific preferable example of such a liquid crystal orientation state-regulating agent include compounds represented by the following formulae (vi) to (xi):

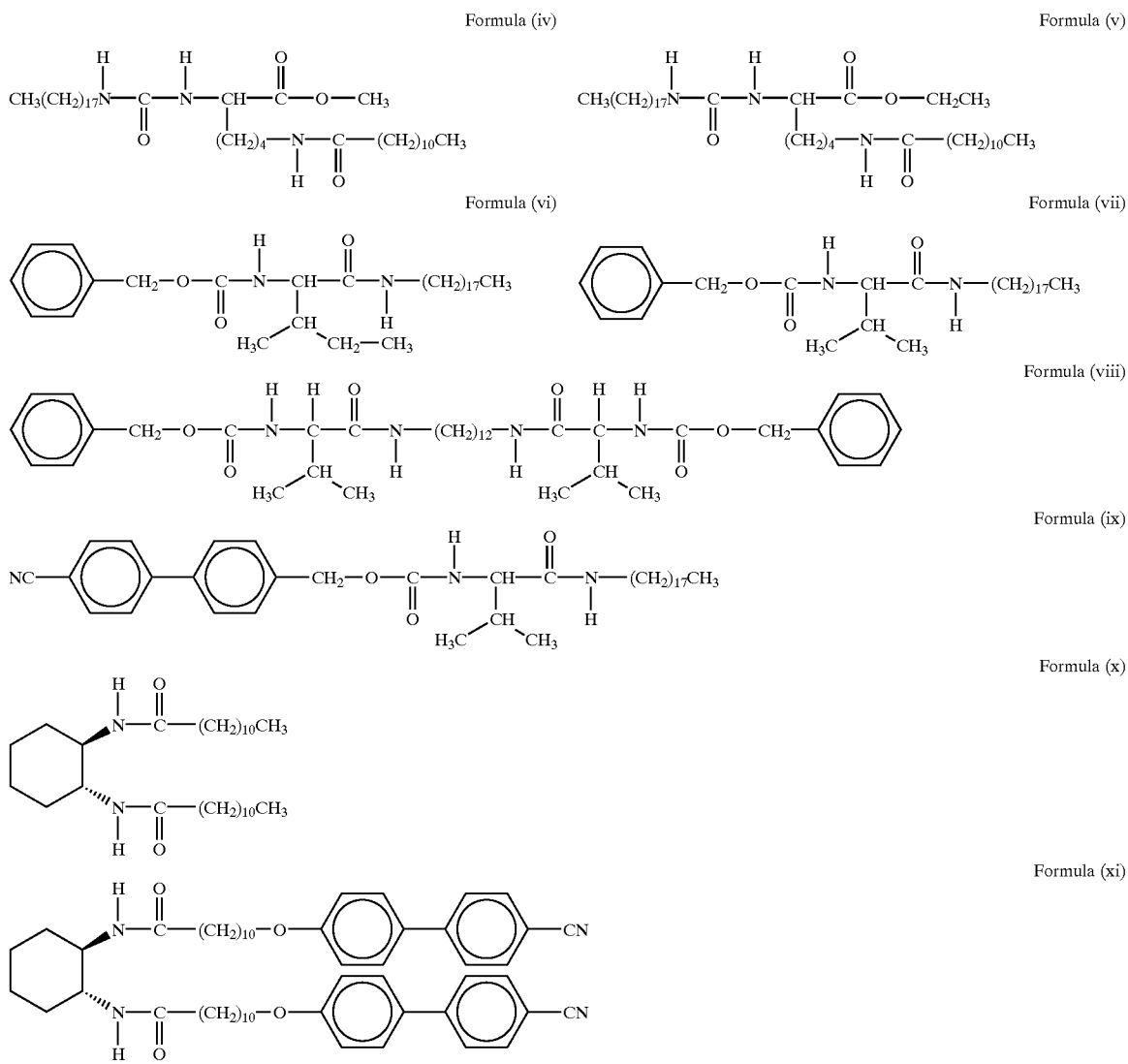

The liquid crystal composition according to the present invention contains such liquid crystalline compound and liquid crystal orientation state-regulating agent. Further, the phase transition temperature between an isotropic liquid phase and a liquid crystal phase in the liquid crystalline compound (hereinafter may also be referred to as "liquid—liquid crystal phase transition temperature") is higher than the gelling temperature by the liquid crystal orientation state-regulating agent, i.e., the gelling temperature of a mixture of the liquid crystalline compound and the liquid crystal orientation state-regulating agent.

The term "gelling temperature" as used herein means a temperature at the time the liquid crystal composition has been transformed from liquid to gel when the liquid crystal composition has been heated to a state that the liquid crystal composition becomes liquid, and the liquid crystal composition in this liquid state has been cooled at a cooling rate of 5° C./min.

Specifically, a difference ($T_1-T_2$) between the liquid—liquid crystal phase transition temperature $T_1$ and the gelling temperature $T_2$ by the liquid crystal orientation state-regulating agent is preferably at least 5° C., more preferably 10 to 30° C. If the difference ($T_1-T_2$) is less than 5° C., a temperature range in which the liquid crystalline compound exhibits a liquid crystal phase, and the whole composition is in a liquid state becomes narrow, so that it may be difficult in some cases to control the state of molecular orientation of the liquid crystalline compound.

The gelling temperature by the liquid crystal orientation state-regulating agent is suitably selected in such a manner that the liquid crystal composition is in a gel state at normal temperature, and is preferably 30° C. or more.

The proportion of the liquid crystal orientation state-regulating agent contained in the liquid crystal composition according to the present invention varies according to the kind thereof and is preferably 0.05 to 30.0% by weight, more preferably 0.05 to 10.0% by weight, still more preferably 0.2 to 5.0% by weight, particularly preferably 0.2 to 3.0% by weight based on the total weight of the liquid crystal orientation state-regulating agent and the liquid crystalline compound. If this proportion is lower than 0.05% by weight, the fluidity of the composition can not be lost enough, so that it may be difficult in some cases to regulate the state of molecular orientation of the liquid crystalline compound. If this proportion exceeds 30.0% by weight on the other hand, the gelling temperature by the liquid crystal orientation state-regulating agent becomes too high, so that it may be difficult in some cases to control the state of the liquid crystalline compound.

The liquid crystal orientation state-regulating agent in the liquid crystal composition according to the present invention is preferably one that forms fibrous aggregates oriented in the same direction as the liquid crystalline compound in a state that the liquid crystalline compound in the liquid crystal composition has been oriented in a direction. Such a liquid crystal orientation state-regulating agent scarcely affects the state of molecular orientation of the liquid crystalline compound upon gelling of the liquid crystal composition in a state that the liquid crystalline compound has been oriented in a direction. In addition, in the state that liquid crystal composition has been gelled, the state of molecular orientation of the liquid crystalline compound is more stably retained by the linear aggregates of the liquid crystal orientation state-regulating agent oriented in the same direction as the liquid crystalline compound.

Whether the liquid crystal orientation state-regulating agent forms fibrous aggregates oriented in the same direction as the liquid crystalline compound or not is determined by, for example, its combination with a liquid crystalline compound used. Examples of specific compositions of the liquid crystalline compound and the liquid crystal orientation state-regulating agent include a combination of the liquid crystalline compound "E63" (product of Merck Co.) with the compound represented by the formula (vi), a combination of the liquid crystalline compound "E63" (product of Merck Co.) with the compound represented by the formula (viii), a combination of the liquid crystalline compound "E63" (product of Merck Co.) with the compound represented by the formula (ix), a combination of the liquid crystalline compound "E63" (product of Merck Co.) with the compound represented by the formula (x) and a combination of a mixture of the liquid crystalline compound represented by the formula (ii) and the liquid crystalline compound represented by the formula (iii) with the compound represented by the formula (vi). However, the present invention is not limited to these combinations.

Since the liquid crystal composition according to the present invention comprises the liquid crystalline compound and the liquid crystal orientation state-regulating agent, and the liquid—liquid crystal phase transition temperature $T_1$ of the liquid crystalline compound is higher than the gelling temperature $T_2$ by the liquid crystal orientation state-regulating agent, the liquid crystal composition becomes an optically isotropic liquid when it is at a temperature higher than the liquid—liquid crystal phase transition temperature $T_1$ of the liquid crystalline compound; the liquid crystal composition becomes an optically anisotropic liquid (liquid crystal) when it is at a temperature higher than the gelling temperature $T_2$ by the liquid crystal orientation state-regulating agent, but not higher than the liquid—liquid crystal phase transition temperature $T_1$ of the liquid crystalline compound; or the liquid crystal composition becomes optically anisotropic gel (liquid crystal gel) due to substantial loss of its fluidity when it is at a temperature not higher than the gelling temperature $T_2$ by the liquid crystal orientation state-regulating agent.

According to the liquid crystal composition of the present invention having such characteristics, the liquid crystal composition, which has been heated to a temperature higher than the liquid—liquid crystal phase transition temperature $T_1$, is cooled to a temperature not higher than the liquid—liquid crystal phase transition temperature $T_1$ while causing an electric field to effect on the liquid crystal composition or without causing an electric field to effect, whereby the state of molecular orientation of the liquid crystalline compound can be controlled. The liquid crystal composition is then cooled to a temperature not higher than the gelling temperature $T_2$ by the liquid crystal orientation state-regulating agent, whereby the fluidity of the liquid crystal composition is lost by the liquid crystal orientation state-regulating agent, and the state of molecular orientation of the liquid crystalline compound is regulated, so that the state of molecular orientation of the liquid crystalline compound can be stably retained even after the effect of the electric field is lost. The liquid crystal composition is heated again to a temperature higher than the liquid—liquid crystal phase transition temperature $T_1$, whereby the liquid crystal composition turns into an optically isotropic liquid, so that the state of molecular orientation of the liquid crystalline compound can be changed.

No particular limitation is imposed on the specific structure of the liquid crystal display device according to the present invention so far as it has a liquid crystal layer formed of the above-described liquid crystal composition, and so any of structures of the conventionally known, various liquid crystal display devices can be adopted.

The liquid crystal layer is generally formed between 2 substrates arranged in opposition to each other, and an electrode for causing an electric field to effect on the liquid crystal layer is provided on each of these 2 substrates. When the anisotropy of dielectric constant of the liquid crystalline compound in the liquid crystal composition is negative, an orientation treatment for orienting molecules of the liquid crystalline compound, for example, in a thickness-wise direction of the liquid crystal layer is subjected on the inner surface of each substrate.

The thickness of the liquid crystal layer is suitably selected according to the kinds of components in the liquid crystal composition, the end application intended of the liquid crystal display device, and/or the like, and it is preferably 1 to 50 $\mu$m, more preferably 5 to 25 $\mu$m from the viewpoint of providing a liquid crystal layer high in contrast between a light-scattering state and a light-transmitting state.

One or both of the substrates between which the liquid crystal layer is formed are formed of a transparent material. Materials for forming the substrates may be either rigid materials such as glass plates and metal plates or flexible materials such as resin films.

The electrodes provided on one or both of the substrates are formed of a transparent material. As such a transparent material, may be used ITO.

The liquid crystal layer can be formed by applying the above-described liquid crystal composition to the surface of the substrate by means of a coating device such as a spin coater, bar coater or roll coater in a state that the liquid crystal composition has been heated to a temperature higher than the gelling temperature $T_2$ by the liquid crystal orientation state-regulating agent.

According to the liquid crystal display device of the present invention, the liquid crystal layer, in a state of an isotropic liquid phase by being heated to a temperature higher than the liquid—liquid crystal phase transition temperature $T_1$, is cooled to a temperature not higher than the liquid—liquid crystal phase transition temperature $T_1$ while causing an electric field to effect on the liquid crystal layer in the thickness-wise direction thereof according to a display pattern, whereby the liquid crystalline compound is transformed from the isotropic liquid phase to the liquid crystal phase, thereby forming the intended display pattern in the liquid crystal layer. The liquid crystal layer in such a state is then cooled to a temperature not higher than the gelling temperature $T_2$ by the liquid crystal orientation state-regulating agent, thereby gelling the liquid crystal layer so that the display pattern formed in the liquid crystal layer is fixed. After such a manner, the intended image is displayed.

A displaying method by a liquid crystal display device having a liquid crystal layer in which the anisotropy of dielectric constant of a liquid crystalline compound is positive, and a displaying method by a liquid crystal display device having a liquid crystal layer in which the anisotropy of dielectric constant of a liquid crystalline compound is negative will hereinafter be described specifically.

(1) Displaying method by the liquid crystal display device having the liquid crystal layer in which the anisotropy of dielectric constant of the liquid crystalline compound is positive:

When a liquid crystal layer 3 formed between substrates 1 and 2 is first heated to a temperature higher than the liquid—liquid crystal phase transition temperature $T_1$ of a liquid crystalline compound in the liquid crystal layer, the liquid crystalline compound in the liquid crystal layer 3 exhibits an isotropic liquid phase, so that molecules 4 of the liquid crystalline compound are in a state distributed without any order as illustrated in FIG. 1A. On the other hand, since the temperature of a liquid crystal orientation state-regulating agent at this time is higher than the gelling temperature $T_2$ by the liquid crystal orientation state-regulating agent, no hydrogen bond by a hydrogen bond-forming group is formed among the molecules 5 of the liquid crystal orientation state-regulating agent, whereby the molecules 5 are in a state dispersed in the liquid crystal layer 3.

Figure 1B:
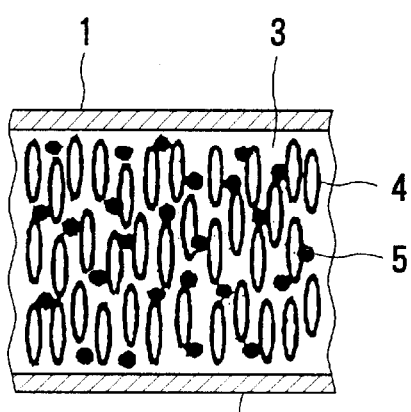
Figure 1D:
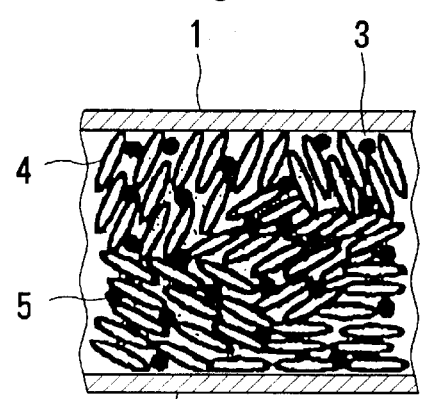

The liquid crystal layer 3 is then cooled to a temperature not higher than the liquid—liquid crystal phase transition temperature $T_1$ of the liquid crystalline compound, but higher than the gelling temperature $T_2$ by the liquid crystal orientation state-regulating agent while causing an electric field to effect by means of electrodes (not illustrated) provided on the substrates 1 and 2 on the liquid crystal layer 3 in the thickness-wise direction thereof according to a display pattern to be formed. As a result, the liquid crystalline compound is transformed from the isotropic liquid phase to a liquid crystal phase in portions of the liquid crystal layer 3, on which the electric field has effected, in a state that the molecules 4 of the liquid crystalline compound have been oriented in the thickness-wise direction as illustrated in FIG. 1B, whereby such portions become a light-transmitting state through which light is transmitted in the thickness-wise direction thereof. On the other hand, the liquid crystalline compound is transformed from the isotropic liquid phase to a liquid crystal phase in portions of the liquid crystal layer 3, on which no electric field has effected, in a state that the molecules 4 of the liquid crystalline compound have been remained distributed without any order as illustrated in FIG. 1D, whereby such portions become a light-scattering state by which light is scattered. In such a manner, the portions in the light-transmitting state (hereinafter may also be referred to as "light-transmitting portions") and the portions in the light-scattering state (hereinafter may also be referred to as "light-scattering portions") are formed in the liquid crystal layer 3, whereby the intended display pattern is formed. In the above, the molecules 5 of the liquid crystal orientation state-regulating agent remain dispersed in the liquid crystal layer 3 because they are at the temperature higher than the gelling temperature $T_2$ by the liquid crystal orientation state-regulating agent.

Figure 1C:
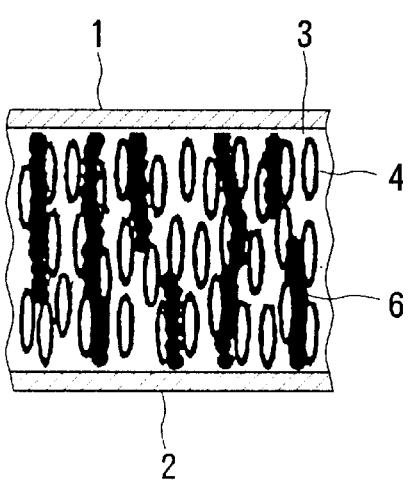
Figure 1E:
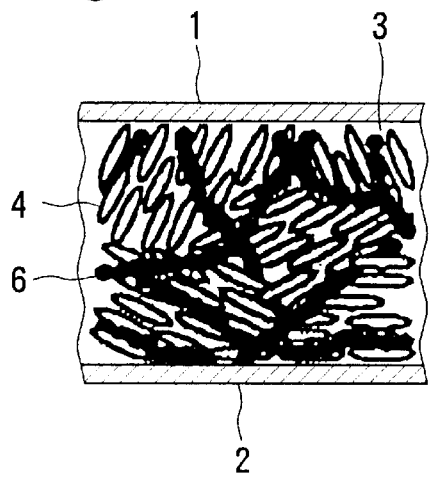

The liquid crystal layer 3 in such a state is further cooled to a temperature not higher than the gelling temperature $T_2$ by the liquid crystal orientation state-regulating agent. As a result, since the molecules 4 of the liquid crystalline compound oriented in the thickness-wise direction are present in the portions of the liquid crystal layer 3, on which the electric field has effected, fibrous aggregates 6 composed of the molecules of the liquid crystal orientation state-regulating agent fibrously aggregated by forming hydrogen bonds among the molecules are formed in a state oriented in the thickness-wise direction, i.e., the same direction as the molecules 4 of the liquid crystalline compound as illustrated in FIG. 1C. On the other hand, since the molecules 4 of the liquid crystalline compound are present in a state distributed without any order in the portions of the liquid crystal layer 3, on which no electric field has effected, fibrous aggregates 6 composed of the molecules of the liquid crystal orientation state-regulating agent fibrously aggregated by forming hydrogen bonds among the molecules are formed without any order as illustrated in FIG. 1E. In such a manner, the fluidity of the liquid crystal layer 3 is lost to form gel, whereby the display pattern formed in the liquid crystal layer 3 is fixed to display the intended image.

In the state that the liquid crystal layer 3 is at a temperature not higher than the gelling temperature $T_2$ by the liquid crystal orientation state-regulating agent, the oriented state of the liquid crystalline compound molecules 4 in the liquid crystal layer 3 is regulated by the linear aggregates 6 composed of the molecules of the liquid crystal orientation state-regulating agent, so that the oriented state of the liquid crystalline compound molecules 4 remains unchanged even after the effect of the electric field is ceased. Accordingly, the light-transmitting portions (portions to which the electric field has effected) and the light-scattering portions (portions to which no electric field has effected) in the liquid crystal layer 3 are maintained as they are, so that the displayed state is stably retained.

When the liquid crystal layer 3 is further heated to a temperature higher than the liquid—liquid crystal phase transition temperature $T_1$ of the liquid crystalline compound therein, the hydrogen bonds among the molecules of the liquid crystal orientation state-regulating agent in the linear aggregates 6 are broken, and moreover the liquid crystalline compound is transformed from the liquid crystal phase to the isotropic liquid phase, so that the liquid crystal layer 3 becomes a state illustrated in FIG. 1A, i.e., a state in which the molecules 5 of the liquid crystal orientation state-regulating agent are dispersed, and the liquid crystalline compound molecules 4 are distributed without any order, whereby the displayed state is dissolved.

Figure 2A:
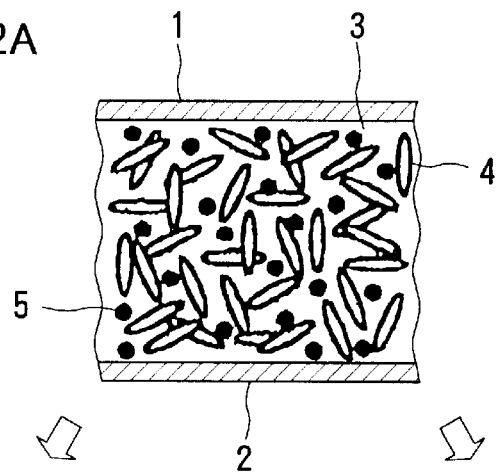
FIGS. 2A to 2E typically illustrate changes of state by temperature changes in a liquid crystal layer in which the anisotropy of dielectric constant of a liquid crystalline compound is negative.

(2) Displaying method by the liquid crystal display device having the liquid crystal layer in which the anisotropy of dielectric constant of the liquid crystalline compound is negative:

When a liquid crystal layer 3 formed between substrates 1 and 2 is first heated to a temperature higher than the liquid—liquid crystal phase transition temperature $T_1$ of a liquid crystalline compound in the liquid crystal layer, the liquid crystalline compound in the liquid crystal layer 3 exhibits an isotropic liquid phase, so that molecules 4 of the liquid crystalline compound are in a state distributed without any order as illustrated in FIG. 2A. On the other hand, since the temperature of a liquid crystal orientation state-regulating agent at this time is higher than the gelling temperature $T_2$ by the liquid crystal orientation state-regulating agent, no hydrogen bond by a hydrogen bond-forming group is formed among the molecules 5 of the liquid crystal orientation state-regulating agent, whereby the molecules 5 are in a state dispersed in the liquid crystal layer 3.

Figure 2B:
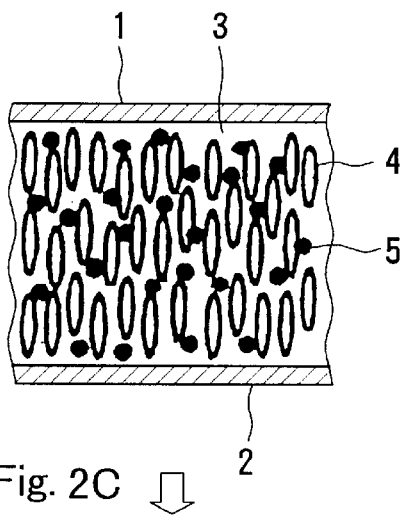
Figure 2D:
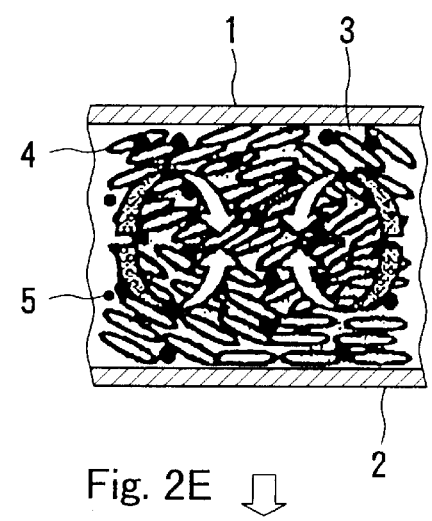

The liquid crystal layer 3 is then cooled to a temperature not higher than the liquid—liquid crystal phase transition temperature $T_1$ of the liquid crystalline compound, but higher than the gelling temperature $T_2$ by the liquid crystal orientation state-regulating agent while causing an electric field to effect by means of electrodes (not illustrated) provided on the substrates 1 and 2 on the liquid crystal layer 3 in the thickness-wise direction thereof according to a display pattern to be formed. As a result, the liquid crystalline compound is transformed from the isotropic liquid phase to a liquid crystal phase in portions of the liquid crystal layer 3, on which no electric field has effected, in a state that the molecules 4 of the liquid crystalline compound have been oriented in the thickness-wise direction by, for example, orientation films (not illustrated) formed on the inner surfaces of the substrates 1 and 2 as illustrated in FIG. 2B, whereby such portions become a light-transmitting state that light is transmitted in the thickness-wise direction thereof. On the other hand, the liquid crystalline compound is transformed from the isotropic liquid phase to a liquid crystal phase in portions of the liquid crystal layer 3, on which the electric field has effected, in a state that the molecules 4 of the liquid crystalline compound have been caused to turbulently flow as illustrated in FIG. 2D, whereby such portions become a light-scattering state (dynamic light-scattering state) through which light is scattered. In such a manner, the light-transmitting portions and the light-scattering portions are formed in the liquid crystal layer 3, whereby the intended display pattern is formed. In the above, the molecules 5 of the liquid crystal orientation state-regulating agent remain dispersed in the liquid crystal layer 3 because they are at the temperature higher than the gelling temperature $T_2$ by the liquid crystal orientation state-regulating agent.

Figure 2C:
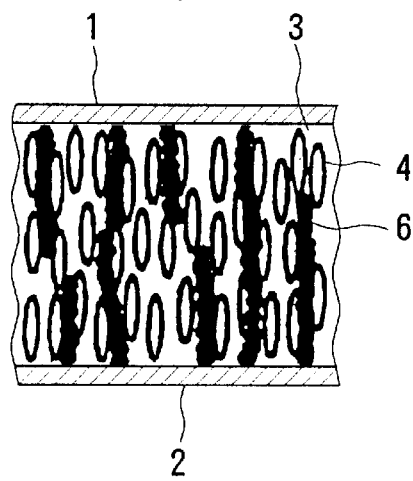
Figure 2E:
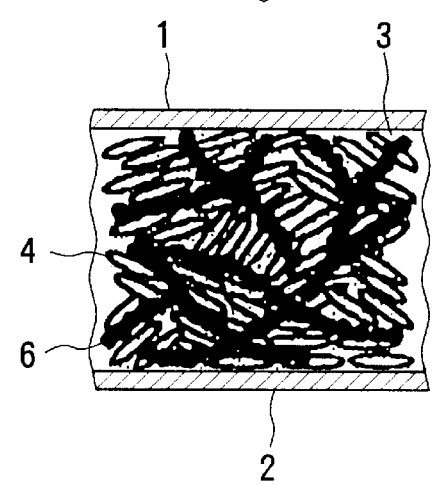

The liquid crystal layer 3 in such a state is further cooled to a temperature not higher than the gelling temperature $T_2$ by the liquid crystal orientation state-regulating agent. As a result, since the molecules 4 of the liquid crystalline compound oriented in the thickness-wise direction are present in the portions of the liquid crystal layer 3, on which no electric field has effected, fibrous aggregates 6 composed of the molecules of the liquid crystal orientation state-regulating agent fibrously aggregated by forming hydrogen bonds among the molecules are formed in a state oriented in the thickness-wise direction, i.e., the same direction as the molecules 4 of the liquid crystalline compound as illustrated in FIG. 2C. On the other hand, since the molecules 4 of the liquid crystalline compound are present in a state turbulently flowed in the portions of the liquid crystal layer 3, on which the electric field has effected, fibrous aggregates 6 composed of the molecules of the liquid crystal orientation state-regulating agent fibrously aggregated by forming a hydrogen bonds among the molecules are formed without any order as illustrated in FIG. 2E. In such a manner, the fluidity of the liquid crystal layer 3 is lost to form gel, whereby the display pattern formed in the liquid crystal layer 3 is fixed to display the intended image.

In the state that the liquid crystal layer 3 is at a temperature not higher than the gelling temperature $T_2$ by the liquid crystal orientation state-regulating agent, the oriented state of the liquid crystalline compound molecules 4 in the liquid crystal layer 3 is regulated by the linear aggregates 6 composed of the molecules of the liquid crystal orientation state-regulating agent, so that the oriented state of the liquid crystalline compound molecules 4 remains unchanged even after the effect of the electric field is ceased. Accordingly, the light-transmitting portions (portions to which by no electric field has effected) and the light-scattering portions (portions to which the electric field has effected) in the liquid crystal layer 3 are maintained as they are, so that the displayed state is stably retained.

When the liquid crystal layer 3 is further heated to a temperature higher than the liquid—liquid crystal phase transition temperature $T_1$ of the liquid crystalline compound therein, the hydrogen bonds among the molecules of the liquid crystal orientation state-regulating agent in the linear aggregates 6 are broken, and moreover the liquid crystalline compound is transformed from the liquid crystal phase to the isotropic liquid phase, so that the liquid crystal layer 3 becomes a state illustrated in FIG. 2A, i.e., a state that the molecules 5 of the liquid crystal orientation state-regulating agent are dispersed, and the liquid crystalline compound molecules 4 are distributed without any order, whereby the displayed state is dissolved.

The present invention will hereinafter be described specifically by the following examples. However, the present invention is not limited to these examples.

EXAMPLE 1

A liquid crystalline compound, "E63" (product of Merck Co.; liquid crystalline compound whose liquid—liquid crystal phase transition temperature $T_1$ is 87° C. and whose anisotropy of dielectric constant is positive; 99.0 parts by weight) and a compound (1.0 part by weight) represented by the formula (iv) were dissolved in methylene chloride at room temperature. This solution was air-dried in a draft, thereby evaporating methylene chloride to prepare a liquid crystal composition of a gel state. The gelling temperature $T_2$ of this liquid crystal composition was measured and found to be 58° C.

Two glass substrates each provided with a transparent electrode formed of an ITO film were provided, the liquid crystal composition in a liquid state by heating was applied to one side of one substrate, and the other substrate was laid thereon to fix them, thereby fabricating a liquid crystal display device having a liquid crystal layer having a thickness of 16 μm.

EXAMPLE 2

A liquid crystal composition was prepared in the same manner as in Example 1 except that the amount of the liquid crystalline compound, "E63" used was changed to 98.0 parts by weight, and the amount of the compound represented by the formula (iv) used was changed to 2.0 parts by weight to fabricate a liquid crystal display device. The gelling temperature $T_2$ of this liquid crystal composition was measured and found to be 59° C.

EXAMPLE 3

A liquid crystal composition was prepared in the same manner as in Example 1 except that a compound represented by the formula (viii) was used in place of the compound represented by the formula (iv) to fabricate a liquid crystal display device. The gelling temperature $T_2$ of this liquid crystal composition was measured and found to be 64° C.

EXAMPLE 4

A liquid crystal composition was prepared in the same manner as in Example 1 except that a compound represented by the formula (ix) was used in place of the compound represented by the formula (iv) to fabricate a liquid crystal display device. The gelling temperature $T_2$ of this liquid crystal composition was measured and found to be 40° C.

EXAMPLE 5

A liquid crystal composition was prepared in the same manner as in Example 1 except that a compound represented by the formula (x) was used in place of the compound represented by the formula (iv) to fabricate a liquid crystal display device. The gelling temperature $T_2$ of this liquid crystal composition was measured and found to be 69° C.

EXAMPLE 6

A liquid crystal composition was prepared in the same manner as in Example 1 except that a mixture of a compound (liquid crystalline compound whose anisotropy of dielectric constant is negative; 49.5 parts by weight) represented by the formula (ii) and a compound (liquid crystalline compound whose anisotropy of dielectric constant is negative; 49.5 parts by weight) represented by the formula (iii) was used in place of the liquid crystalline compound "E63" (99.0 parts by weight). A liquid crystal display device was fabricated in the same manner as in Example 1 except that this liquid crystal composition was used, and substrates on the inner surfaces of which an orientation treatment had been subjected were used. The liquid—liquid crystal phase transition temperature $T_1$ in the liquid crystalline compound mixture was measured and found to be 53° C., and the gelling temperature $T_2$ of the liquid crystal composition was measured and found to be 49° C.

[Evaluation of liquid crystal display device]

With respect to the liquid crystal display devices according to Examples 1 to 6, evaluation was conducted in the following manner.

(1) The liquid crystal layer in each liquid crystal display device was heated to a temperature higher than the liquid—liquid crystal phase transition temperature $T_1$ of the liquid crystalline compound in the liquid crystal layer, and then cooled to room temperature at a cooling rate of 10° C./min. Thereafter, the total light transmittance of the liquid crystal layer was measured. The liquid crystal display device was left to stand for 10 days in this state to determine the state of change in the total light transmittance of the liquid crystal layer.

(2) The liquid crystal layer in each liquid crystal display device was heated to a temperature higher than the liquid—liquid crystal phase transition temperature $T_1$ of the liquid crystalline compound in the liquid crystal layer, and then cooled to room temperature at a cooling rate of 10° C./min while applying ac voltage of 50 V at a frequency of 300 Hz to the liquid crystal layer. After the application of the ac voltage was ceased, the total light transmittance of the liquid crystal layer was measured. The liquid crystal display device was left to stand for 10 days in this state to determine the state of change in the total light transmittance of the liquid crystal layer.

The results of the above tests are shown in Table 1.

TABLE 1

| | Anisotropy of Dielectric Constant of Liquid Crystalline Compound | Concentration of Liquid Crystal Orientation State-Regulating Agent (mol %) | Total Light Transmittance (%) | | Change in the Total Light Transmittance | |
|---|---|---|---|---|---|---|
| | | | Applying ac Voltage of 0 V | Applying ac Voltage of 50 V | Applying ac Voltage of 0 V | Applying ac Voltage of 50 V |
| Example 1 | Positive | 1.0 | 8.4 | 68.3 | Not Observed | Not Observed |
| Example 2 | Positive | 2.0 | 4.5 | 32.6 | Not Observed | Not Observed |
| Example 3 | Positive | 1.0 | 6.4 | 58.9 | Not Observed | Not Observed |
| Example 4 | Positive | 1.0 | 0.1 | 10.3 | Not Observed | Not Observed |
| Example 5 | Positive | 1.0 | 4.2 | 10.3 | Not Observed | Not Observed |
| Example 6 | Negative | 1.0 | 58.9 | 1.5 | Not Observed | Not Observed |

As apparent from the results shown in Table 1, it was confirmed that according to each of the liquid crystal compositions of Examples 1 to 6, the state of molecular orientation of the liquid crystalline compound can be controlled by cooling the liquid crystal composition heated to a temperature higher than the liquid—liquid crystal phase transition temperature $T_1$ of the liquid crystalline compound while causing an electric field to effect on the liquid crystal composition or without causing an electric field to effect, and moreover the state of molecular orientation of the liquid crystalline compound is stably retained over a long period of time.

As described above, according to the liquid crystal compositions of the present invention, the state of molecular orientation of the liquid crystalline compound can be stably retained even when no electric field is caused to effect thereon, and moreover the state of molecular orientation of the liquid crystalline compound can be changed.

According to the liquid crystal display devices of the present invention, the displayed state can be stably retained even after the effect of the electric field is ceased, and moreover the displayed state can be easily dissolved.

According to the liquid crystal displaying method of the present invention, the displayed state can be stably retained even after the effect of the electric field is ceased, and moreover the displayed state can be easily dissolved.

What is claimed is:

1. A method comprising;
    cooling a liquid crystal layer formed of a liquid crystal composition to a temperature not higher than a phase transition temperature between an isotropic liquid phase and a liquid crystal phase in the liquid crystalline compound in a state that the liquid crystalline compound is in the isotropic liquid phase while causing an electric field to effect the liquid crystal layer in a thickness-wise direction thereof according to a display pattern, whereby the liquid crystalline compound is transformed from the isotropic liquid phase to the liquid crystal phase, and
    cooling the liquid crystal layer in the state of the liquid crystal phase, to a temperature not higher than the gelling temperature by a liquid crystal orientation state-regulating agent, whereby the liquid crystal composition is gelled, wherein the liquid crystal composition comprises a liquid crystalline compound and the liquid crystal orientation state-regulating agent for regulating the orientated state of the liquid crystalline compound by gelling, wherein a phase transition temperature ($T_1$) between an isotropic liquid phase and a liquid crystal phase in the liquid crystalline compound is higher than a gelling temperature ($T_2$) by the liquid crystal orientation state-regulating agent.

2. The method according to claim 1, wherein the liquid crystal orientation state-regulating agent is one that forms fibrous aggregates oriented in the same direction as the liquid crystalline compound in a state that the liquid crystalline compound has been oriented in a direction.

3. The method according to claim 1, wherein the liquid crystal orientation state-regulating agent comprises a compound having at least one group capable of forming an intermolecular hydrogen bond and at least one alkylene group in its molecule.

4. The method according to claim 3, wherein the liquid crystal orientation state-regulating agent comprises a compound having a group represented by the following general formula (1):

—NH—CHR$^1$—CO— wherein R$^1$ means a hydrogen atom or a monovalent organic group.

5. The method according to claim 1, wherein $T_1$–$T_2$ is at least 5° C.

6. The method according to claim 1, wherein $T_2$ is at least 30° C.

7. The method according to claim 1, wherein the liquid crystal orientation state-regulating agent is present in a proportion of 0.05 to 30.0% by weight based on the total weight of the liquid crystal orientation state-regulating agent and the liquid crystalline compound.

8. The method according to claim 1, wherein said liquid crystal layer is located within a liquid crystal device.

9. The method according to claim 2, wherein the liquid crystal orientation state-regulating agent comprises a compound having at least one group capable of forming an intermolecular hydrogen bond and at least one alkylene group in its molecule.

10. The method according to claim 9, wherein the liquid crystal orientation state-regulating agent comprises a compound having a group represented by the following general formula (1):

—NH—CHR$^1$—CO— wherein R$^1$ means a hydrogen atom or a monovalent organic group.

11. The method according to claim 2, wherein said liquid crystal layer is located within a liquid crystal device.

12. The method according to claim 3, wherein said liquid crystal layer is located within a liquid crystal device.

13. The method according to claim 4, wherein said liquid crystal layer is located within a liquid crystal device.

14. The method according to claim 5, wherein said liquid crystal layer is located within a liquid crystal device.

15. The method according to claim 6, wherein said liquid crystal layer is located within a liquid crystal device.

16. The method according to claim 7, wherein said liquid crystal layer is located within a liquid crystal device.

17. The method according to claim 1, wherein said liquid crystal orientation state-regulating agent comprises at least one compound selected from the following formulae (iv)–(xi):

Formula (iv)

$$CH_3(CH_2)_{17}N(H)-\underset{\underset{O}{\|}}{C}-N(H)-CH(-(CH_2)_4-N(H)-\underset{\underset{O}{\|}}{C}-(CH_2)_{10}CH_3)-\underset{\underset{O}{\|}}{C}-O-CH_3$$

Formula (v)

$$CH_3(CH_2)_{17}N(H)-\underset{\underset{O}{\|}}{C}-N(H)-CH(-(CH_2)_4-N(H)-\underset{\underset{O}{\|}}{C}-(CH_2)_{10}CH_3)-\underset{\underset{O}{\|}}{C}-O-CH_2CH_3$$

Formula (vi)

$$C_6H_5-CH_2-O-\underset{\underset{O}{\|}}{C}-N(H)-CH(-CH(CH_3)-CH_2-CH_3)-\underset{\underset{O}{\|}}{C}-N(H)-(CH_2)_{17}CH_3$$

Formula (vii)

$$C_6H_5-CH_2-O-\underset{\underset{O}{\|}}{C}-N(H)-CH(-CH(CH_3)_2)-\underset{\underset{O}{\|}}{C}-N(H)-(CH_2)_{17}CH_3$$

-continued
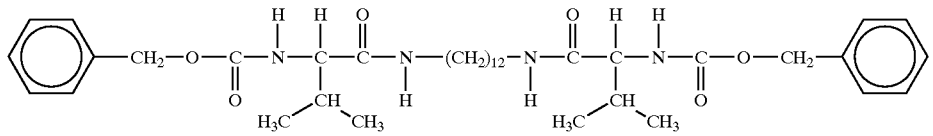
Formula (viii)
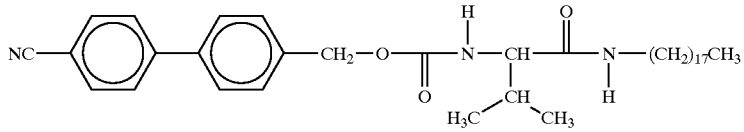
Formula (ix)
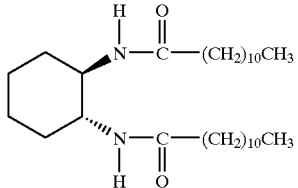
Formula (x)
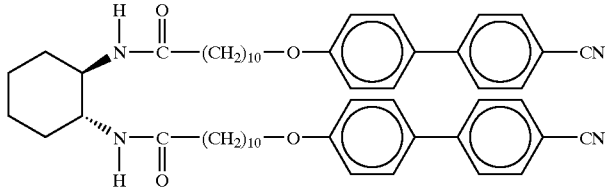
Formula (xi)
18. The method according to claim 8, wherein said liquid crystal orientation state-regulating agent comprises at least one compound selected from the following formulae (iv)–(xi):
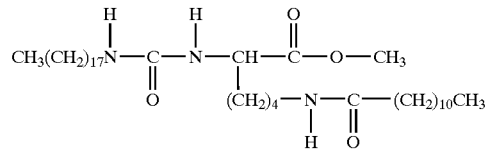
Formula (iv)
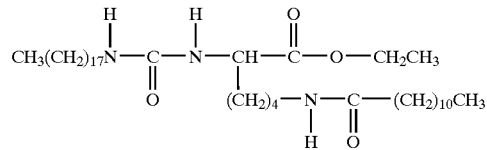
Formula (v)
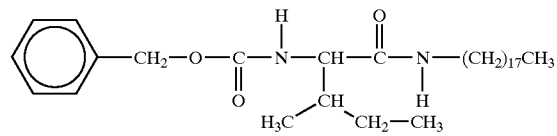
Formula (vi)
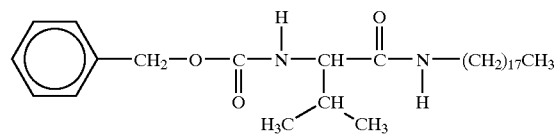
Formula (vii)
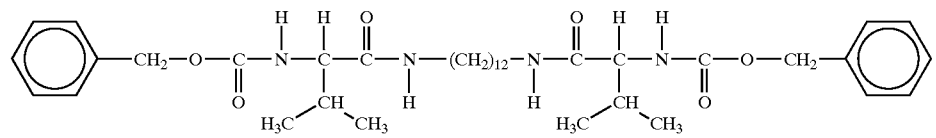
Formula (viii)

-continued
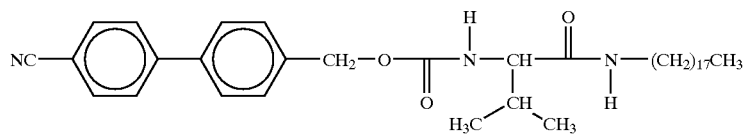
Formula (ix)
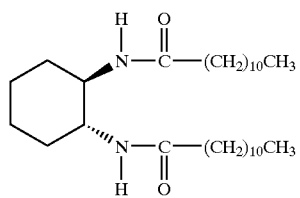
Formula (x)
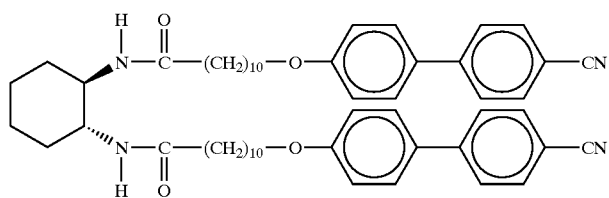
Formula (xi)
19. The method according to claim 5, wherein $T_1-T_2$ is 10–30° C.
20. The method according to claim wherein said liquid crystal layer is 5 to 25 μm thick.
* * * * *